March 11, 1952 J. W. NAPIER 2,588,868
BROODING METHOD

Filed July 11, 1947 3 Sheets-Sheet 1

INVENTOR.
James W. Napier
BY his attorneys,
Christy, Parmelee & Strickland

March 11, 1952  J. W. NAPIER  2,588,868
BROODING METHOD
Filed July 11, 1947  3 Sheets-Sheet 2
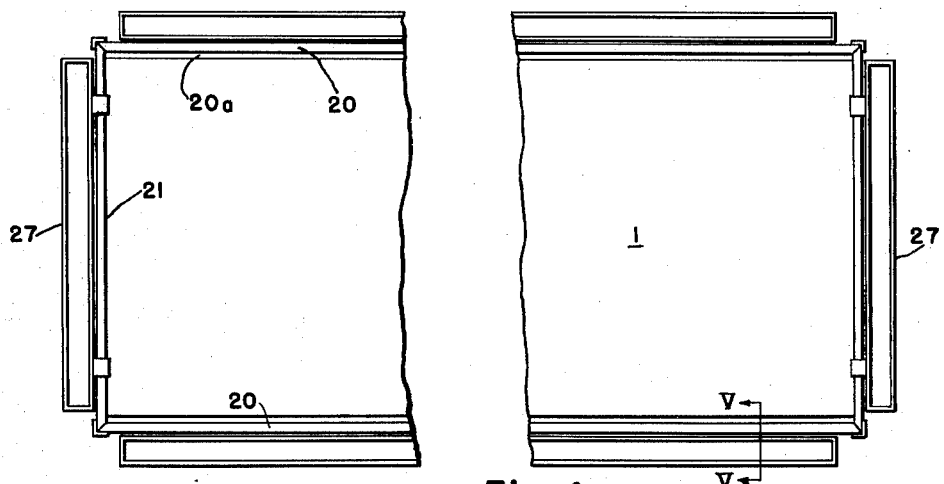
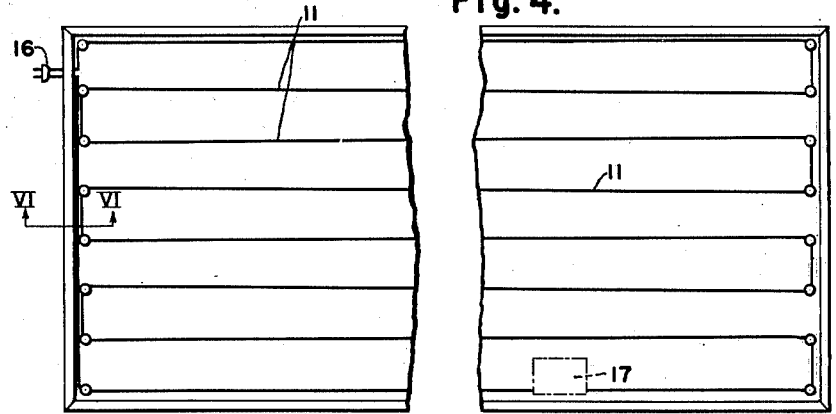
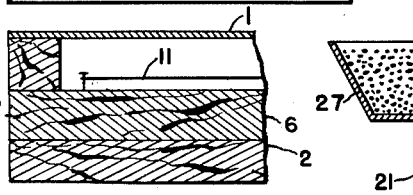
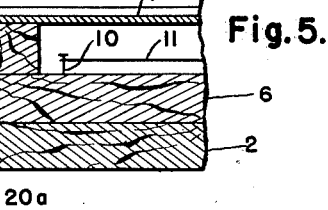
INVENTOR.
James W. Napier
BY *his attorneys,*
*Christy, Parmelee & Strickland*

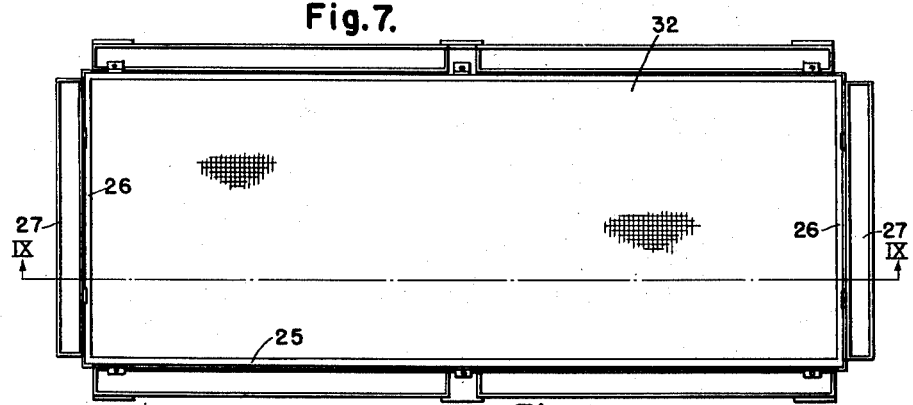
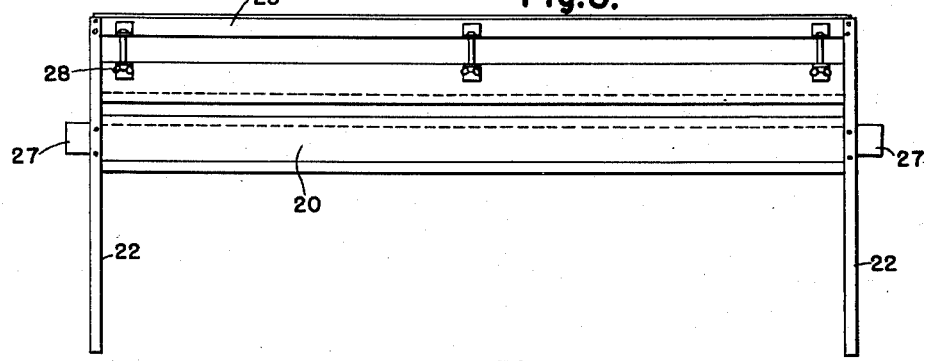
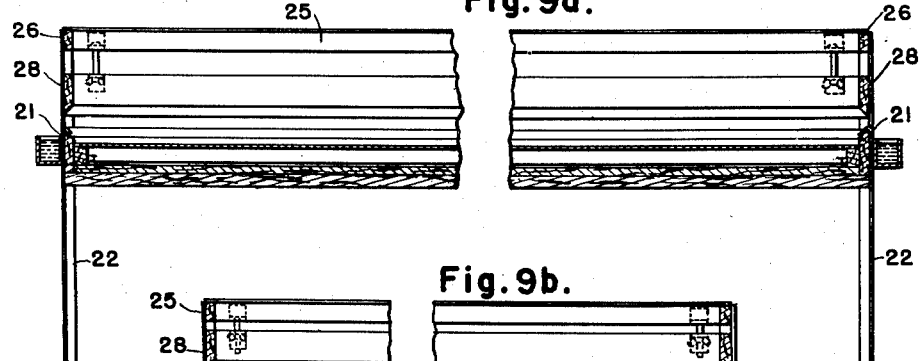
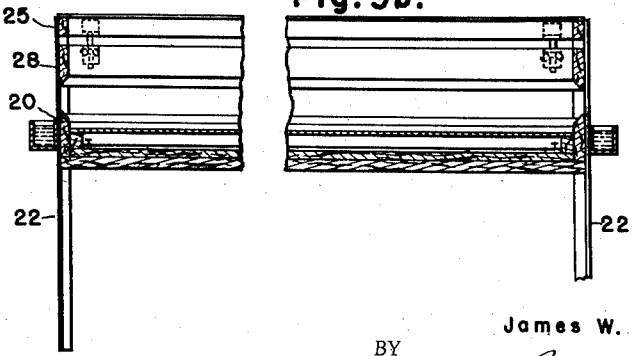

Patented Mar. 11, 1952

2,588,868

UNITED STATES PATENT OFFICE 2,588,868

BROODING METHOD

James W. Napier, Macon, Ga., assignor of one-tenth to William J. Ruano, Pittsburgh, Pa.; Margaret H. Napier executrix of estate of said James W. Napier, deceased Application July 11, 1947, Serial No. 760,211

1 Claim. (Cl. 119—31)

The present invention relates to a brooding method and apparatus for raising poultry from chick size to broiler size or thereabouts. A very common method of raising poultry in brooders comprises applying initially, from above the chicks, a temperature of 90° to 95° F. and maintaining such temperature for a period of a week and then reducing it 5° and maintaining the reduced temperature for another week and successively reducing it weekly in about 5° intervals until normal room temperature is obtained. Usually, such temperature is applied from above the chicks on the theory that this simulates natural brooding of the chicks when under the hen. Common types of brooder structures for applying such temperatures are of a construction such that droppings tend to accumulate on the floor, giving rise to nauseating odors and the spread of disease which oftentimes results in total loss of chicks, furthermore, such droppings are usually rendered unusable.

An object of the present invention is to provide a novel method for brooding poultry from the chick stage to the broiler stage employing the application of a high but critical temperature to an exposed metallic floor on which the chicks rest so as to apply heat from underneath, rather than above, the chicks, thereby enabling the raising of poultry at a quicker rate and with less food than usually required by the employment of presently known methods, and which poultry has a substantial amount of extremely tasty and tender meat and breast. A further object of the present invention is to provide a brooder construction having a metallic floor of good heat conducting material which is heated by means of a uniformly distributed, insulatingly mounted, electrical heater wire disposed and distributed beneath the floor, the temperature of which floor is controlled by a thermostat so that it will be maintained within the range of about 100° to 113° F., an optimum temperature being of the order of 105° F. The unusually high floor temperature employed also provides an effective means for dehydrating or desiccating droppings falling on the floor so that is slits or openings are formed either in or alongside the floor, the chicks will, as a result of scratching and milling around, kick or push the dehydrated or powdered droppings into the slits through which they will fall into collecting containers therebeneath which may be periodically emptied. Such desiccated droppings are very useful as fertilizer, etc. A still further object of the invention is to provide a brooder having vertically adjustable sidewall panels to provide a gap of variable width through which chicks may extend their heads for feeding or drinking from an outside trough.

Other objects and advantages of the present invention will become apparent from a study of the following specification taken with the accompanying drawings wherein:

Fig. 3 is a top or plan view of the brooder shown in Fig. 1 but with the roof removed;

Fig. 4 is a top or plan view of the brooder floor shown in Fig. 2 wherein the top metallic floor element is removed;

Fig. 5 is an enlarged partial cross-sectional view taken along line V—V of Fig. 3;

Fig. 6 is an enlarged partial cross-sectional view taken along line VI—VI of Fig. 4;

Fig. 7 is a plan view of the brooder shown in Fig. 1;

Fig. 8 is a front elevational view of the brooder shown in Fig. 1 with the front troughs removed;

Fig. 9a is an enlarged vertical cross-sectional view taken along line IX—IX of Fig. 7 with parts broken away, showing the adjustable central panel in its lowermost position suitable for small chicks to feed therethrough, and Fig. 9b is a cross-sectional view similar to Fig. 9a except that the adjustable central panel is shown in a more elevated position suitable for grown chickens to feed therethrough.

Figure 1:
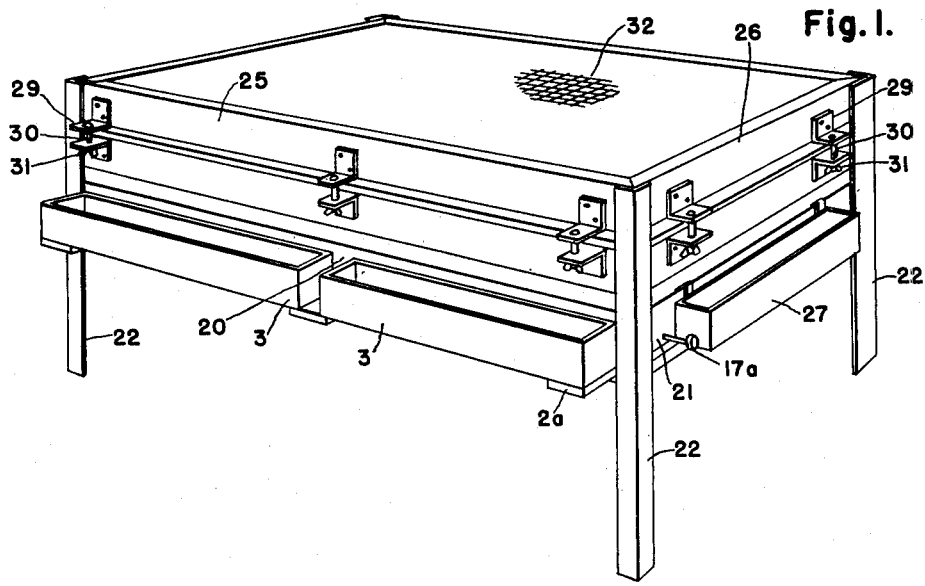
Fig. 1 is a perspective view of a brooder embodying the principles of my invention.
Figure 2:
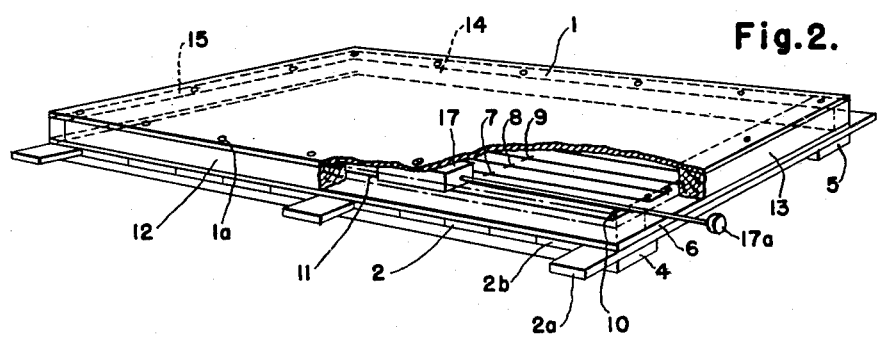
Fig. 2 is a perspective view of the brooder floor shown in Fig. 1 with the top portion partly cut away to more clearly illustrate the heater unit therebeneath.

Referring more particularly to Figs. 1 and 2, numeral 1 denotes a metallic floor made of good heat conducting material, such as aluminum, copper, or the like, or alloys thereof. Such floor may be of any suitable size and thickness. For example, a convenient size for an aluminum or aluminum alloy floor is one 3' x 8' and .050" in thickness. In accordance with the present invention, floor 1 is electrically heated uniformly at a constant temperature. The base structure for the floor preferably has a subflooring 2 comprising a plurality of cross members, such as 2a, 2b, etc., wherein certain of the members, namely, the end ones and one or more central ones, are slightly longer than the remaining members in order to form small projections or ledges which extend laterally outwardly from the longitudinal sides and upon which may be supported feed or water troughs, such as 3. The subflooring members may be securely fastened together by nailing or screwing them to longitudinally extending battens, such as 4 and 5, therebeneath. On the surface of the subflooring 2 any suitable insulating material may be placed, such as rock wool, insulating paper, insulating board, or the like (not shown), to provide an insulated, dust-proof and draft-proof floor structure. Supported on top of such insulation and securely fastened to subflooring 2 is a base 6 comprising a plurality of longitudinally extending boards secured together in side-by-side relationship for the purpose of forming a smooth and substantially continuous supporting surface. Upon base 6 is strung and supported a heater unit 11. The heater unit comprises a continuous heater wire element made of Nichrome or any other suitable material having appreciable electrical resistance for developing the required amount of heat. Heater wire 11 is looped back and forth longitudinally in sinuous form, that is, so as to form a series of inverted U-shaped legs, the ends of the loops being wound about partly driven nails, such as 10, extending along the upper and lower edge portions of base 6. If desired, the wire may be mounted on strips (not shown) fastened on top of base 6 to provide a slight separation of the wire from the top surface of the base. At regular intervals along the lengths of the respective loops, the heater wire 11 is firmly anchored to base 6 by staples, such as 7, 8, 9, etc., to not only effectively support the heater wire so as to prevent vibration or movement thereof, but to confine expansion of the wire, as the result of heating, to short lengths so that no appreciable overall change in length of the wire takes place. Heater wire 11 may be made, for example, of No. 20 B & S gauge Nichrome wire.

It is desirable to space the loops of the wire sufficiently close so as to develop approximately 30 to 35 watts output per square foot of floor surface. Wood is a suitable material for making base 6 since it can readily withstand temperatures up to 113° F. and is a suitable electrical insulating material. It is highly desirable, of course, to space the loops so as to have the same distance apart as well as a constant distance from the metallic floor 1 in order to insure uniform heating of the entire surface of floor 1 and avoid hot spots.

In order to form the necessary spacing between the heater wire 11 and the metal floor 1, a border strip, comprising strip portions 12, 13, 14 and 15 of about ¾" in height, is provided, extending about the entire perimeter of base 6 and securely fastened to said base. Suitable holes, such as 1a, may be drilled at intervals along the perimeter of metallic floor 1 through which screws or other fastening means may be extended so as to securely fasten the floor to strip portions 12 to 15, inclusive.

A suitable outlet plug 16 (Fig. 4) is provided for the purpose of applying an energizing source of electrical potential to heater wire 11, such as the ordinary household 110 volt, 60 cycle A. C. source. In series relationship with heater wire 11, there is provided a thermostat 17 whose bimetallic or other heat responsive element is preferably supported in metallic contact with and immediately beneath the floor 1 so as to be quickly and directly responsive to temperature changes of the floor 1. By suitable adjustment of the thermostat by turning adjusting knob 17a, the floor may be maintained at any predetermined temperature.

In order to support the floor in the brooder, the base 6 and subflooring 2 of the floor assembly are securely fastened by screws, nails, bolts or the like to lower side panels, such as 20, and lower end panels, such as 21, also of wood. The side and end panels in turn are securely fastened to and supported by legs 22, which legs may be made of wood, such as 2" x 4" or 2" x 3" pieces, or preferably of metal in angle form as shown. Securely fastened to the upper ends of the legs are a series of fixed or permanent upper side panels, such as 25, and upper end panels, such as 26. Interposed between each pair of upper and lower side panels is an intermediate vertically adjustable panel, such as 28, which is preferably beveled on the lower inside edge as shown. The lower panel is likewise beveled in the opposite direction along its upper and inner edge for the reason that it has been found that chicks are more inclined to protrude their heads and necks through openings whose upper and lower edges are beveled than they are through square-cut corners or edges. Adjusting bracket pairs, such as 29, are provided having holes in their horizontal portions through which a bolt 30 extends. By screwing or unscrewing either the bolt 30 or wing nut 31, the gap between panels is varied. Thus an adjustable gap is provided between the intermediate panel and lower panel to allow the chicks to extend their necks and heads therethrough so as to feed or drink from the outside troughs. Initially, when the chicks are very small, this gap may be of the order of ⅝" thick, as shown in Fig. 9a, there being a gap preferably of about 2" between the intermediate and top panels, but as the chicks grow older, the lower gap is progressively increased (see Fig. 9b) until finally it may attain a distance of 2½". At this final state, the intermediate panel will probably come almost in contact with the top panel. Such vertically adjustable intermediate strips may be placed along both longitudinal sides of the brooder. Likewise, the end panels may be provided with vertically adjustable intermediate panels, although it has been found that troughs along the longitudinal sides are generally sufficient for feeding and watering all the chicks.

A roof 32 of wire mesh, such as 1" mesh, is provided for admitting light and air from above for the chicks.

It is desirable to provide a small gap 20a between the longitudinal edges of floor 1 and the lower side panels 20 (see Fig. 3) so that the droppings of the chickens which fall on the floor and which become dehydrated or desiccated as the result of heating by the floor, will eventually be pushed into the gaps 20a by the mere scuffing, scratching or milling around of the chicks. Either one gap on one longitudinal side or two gaps on both longitudinal sides may be provided.

Troughs 27 may have supporting straps which rest on the upper edges of end panels 21. Instead of employing extensions, such as 2a, for supporting the troughs along the longitudinal sides, it will be apparent that these troughs likewise may be supported by straps resting on top of the lower side panels 20, if desired.

In operation, after chicks of a day old or so are placed on top of the metallic floor, the thermostat is adjusted so as to provide a floor temperature of the order of 105° F., or at least a temperature in the range of between 100° and 113° F. The floor is kept uncovered and, except for some sprinklings of feed which may be lightly thrown on initially to encourage small chicks to feed, the floor is bare so as to transfer the heat directly to the feet of the chicks. By keeping the floor bare, there is no appreciable temperature lag or latent heat stored in any floor parts, hence the thermostat will respond more quickly to fluctuations in floor temperature so as to more effectively control and keep the floor temperature more nearly constant at all times at the desired temperature, say for example, 105° F. or thereabouts. The above-described temperature of 100° F. or above is maintained throughout the entire life of the chickens. It is most economical to remove the chickens when they attain the fryer stage, that is, when they weigh about 2½ to 3 pounds.

By the above-described method involving my invention, the chicks attain a weight of 2½ to 3 pounds in about 8 weeks, which is a substantially faster growth than normally obtained by common methods. Also, substantial economy is obtained in the matter of feeding. For example, from 2½ to 3 pounds of feed per pound of chicken (live weight) is all that is necessary if the chicks are raised by the present method, as distinguished from the requirement of substantially in excess of three pounds per pound of live weight that is normally obtained by common methods of brooding according to government statistics. Furthermore, the fryers at eight or nine weeks, when they are ready for slaughtering, have a substantial amount of tender and highly palatable breast and meat as compared with ordinary chickens.

Furthermore, the droppings that fall on the metallic, heated floor become immediately desiccated or dehydrated so that as the result of the subsequent milling or scuffing around by the chicks, they are slid into the gaps 20a formed between the lateral edges of the floor and the side panels, or for that matter, may be slid into any other suitable form of slits, such as those which may be cut in the metallic floor (not shown). Collecting troughs (not shown) may be supported immediately underneath the gaps to store the desiccated droppings and from time to time may be emptied. These droppings are excellent for use as fertilizer, etc. Furthermore, the drying of the droppings eliminates the spread of disease often caused by moisture-laden droppings, therefore will cut casualties to an insignificant number.

It is contemplated that a number of units, such as that described, be used so that fryers may be withdrawn from different units at periods of about one week apart. For example, if the average life of a fryer is eight weeks before slaughtering, it is desirable to have eight units and to fill these in succession at one-week intervals so as to obtain groups of full-size fryers at one-week intervals for market.

While the brooder construction has been illustrated and described as being of wood, it will be readily understood that it may be made of other suitable materials, such as metal, so long as suitable insulation is provided for mounting the heater wire and so long as some measure of insulation is provided to confine the heat within the brooder as much as possible. While the brooder has been described as useful for raising chickens, it should be noted that it is equally useful for raising other poultry and game, such as turkeys, quail, etc.

It is further contemplated that the brooder described herein be stored in a room whose temperature does not fall below about 70° F. so as to make it unnecessary to consume too high a wattage of electricity for heating the floor. Suitable means, such as a light, for example, a fluorescent light, mounted on top of the brooder (not shown) may be provided to allow the chicks to see the feed and water troughs.

Thus it will be seen that I have provided an efficient, relatively simple and inexpensive brooder construction as well as a novel method of brooding chicks for enabling the raising of chicks with a small amount of feed and in a shorter period of time than ordinarily possible with present known methods and for developing a higher grade of chicken with a larger amount of tender meat than heretofore attained; furthermore, I have provided a method of raising chicks that is simple and foolproof since it eliminates the necessity of cleaning the floor of the coop, also which substantially eliminates casualties as often caused by disease germs spreading from moisture-laden droppings and the like, and which method and apparatus not only produce a high grade of chicken, but a valuable fertilizer which is automatically desiccated by the heated floor and slid into collecting containers by the chicks themselves.

While I have illustrated and described a single specific embodiment of my invention, it will be understood that this is by way of illustration only, and that various changes and modifications may be made within the contemplation of my invention and within the scope of the following claim.

I claim:

The method of raising poultry from the chick to the broiler stage in a brooder having an uncovered metal floor, comprising applying heat underneath said floor so as to maintain a uniform floor temperature of the order of 105° F.

JAMES W. NAPIER.

REFERENCES CITED

The following references are of record in the file of this patent:

UNITED STATES PATENTS

| Number | Name | Date |
|---|---|---|
| 1,402,335 | Anderson | Jan. 3, 1922 |
| 1,755,520 | Shoup et al. | Apr. 22, 1930 |
| 1,857,858 | Mikkelsen | May 10, 1932 |
| 2,025,310 | Schaefer | Dec. 24, 1935 |
| 2,174,004 | Markey | Sept. 26, 1939 |
| 2,230,158 | Crawford | Jan. 28, 1941 |
| 2,279,405 | Laughlin | Apr. 14, 1942 |
| 2,280,779 | Barragy | Apr. 28, 1942 |
| 2,312,257 | Mahlstadt | Feb. 23, 1943 |
| 2,358,081 | Marick | Sept. 12, 1944 |
| 2,358,938 | Murray | Sept. 26, 1944 |

FOREIGN PATENTS

| Number | Country | Date |
|---|---|---|
| 413,275 | Great Britain | July 10, 1934 |

OTHER REFERENCES

The Electric Brooder, by B. D. Moses and T. A. Wood, Bulletin 441, November, 1927, published by the College of Agriculture, University of California.

Poultry Husbandry, by Morley Allan Jull, 1930, McGraw-Hill Book Company, page 230, 2nd complete paragraph.

Battery Brooding, by Milton H. Arndt, 1931, published by Orange-Judd Publishing Company, Inc., page 96, 2nd paragraph.